US006434600B2

(12) United States Patent
Waite et al.

(10) Patent No.: US 6,434,600 B2
(45) Date of Patent: Aug. 13, 2002

(54) METHODS AND SYSTEMS FOR SECURELY DELIVERING ELECTRONIC MAIL TO HOSTS HAVING DYNAMIC IP ADDRESSES

(75) Inventors: Ryan W. J. Waite; Bruno Lambert, both of Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/153,226

(22) Filed: Sep. 15, 1998

(51) Int. Cl.[7] .................. G06F 15/16; G06F 15/173
(52) U.S. Cl. .................. 709/206; 709/223; 709/245
(58) Field of Search ................ 709/219, 223, 709/226, 206, 207, 245; 713/200, 202, 201; 370/401, 407, 408

(56) References Cited

U.S. PATENT DOCUMENTS

| | | | | |
|---|---|---|---|---|
| 5,307,484 A | * | 4/1994 | Baker et al. | 707/102 |
| 5,432,850 A | * | 7/1995 | Rothenberg | 713/162 |
| 5,519,858 A | * | 5/1996 | Walton et al. | 707/10 |
| 5,623,601 A | * | 4/1997 | Vu | 713/201 |
| 5,684,951 A | * | 11/1997 | Goldman et al. | 713/202 |
| 5,761,201 A | * | 6/1998 | Vaudreuil | 370/392 |
| 5,777,989 A | * | 7/1998 | McGarvey | 370/254 |
| 5,802,320 A | * | 9/1998 | Baehr et al. | 709/249 |
| 5,815,664 A | * | 9/1998 | Asano | 709/227 |
| 5,862,452 A | * | 1/1999 | Cudak et al. | 725/81 |
| 5,941,954 A | * | 8/1999 | Kalajan | 709/239 |
| 5,958,052 A | * | 9/1999 | Bellovin et al. | 713/201 |
| 5,964,891 A | * | 10/1999 | Caswell et al. | 714/31 |
| 6,012,088 A | * | 1/2000 | Li et al. | 709/219 |
| 6,038,601 A | * | 3/2000 | Lambert et al. | 709/226 |
| 6,067,568 A | * | 5/2000 | Li et al. | 709/223 |
| 6,088,796 A | * | 7/2000 | Cianfrocca et al. | 713/152 |
| 6,101,182 A | * | 8/2000 | Sistanizadeh et al. | 370/352 |
| 6,115,545 A | * | 9/2000 | Mellquist | 709/220 |
| 6,118,768 A | * | 9/2000 | Bhatia et al. | 370/254 |
| 6,131,095 A | * | 10/2000 | Low et al. | 707/10 |
| 6,138,146 A | * | 10/2000 | Moon et al. | 709/206 |
| 6,175,867 B1 | * | 1/2001 | Taghadoss | 709/223 |
| 6,182,136 B1 | * | 1/2001 | Ramanathan et al. | 790/224 |

OTHER PUBLICATIONS

Johnathan Postel, RFC 821 "Simple Mail Transfer Protocol," Aug. 1982.
Craig Partridge, RFC 974 "Mail Routing and Domain Name System," Jan. 1996.
The NetBIOS Working Group, RFC 1001 "Protocol Standard for NetBIOS Service on a TCP/UDP Transport: Concepts and Methods," Mar. 1987.

(List continued on next page.)

Primary Examiner—Robert B. Harrell
Assistant Examiner—Jason D. Cardone
(74) Attorney, Agent, or Firm—Leydig, Voit & Mayer, Ltd.

(57) ABSTRACT

The present invention includes methods and systems for securely delivering electronic mail to electronic mail servers having dynamic IP addresses. Before requesting mail delivery, a receiving mail server having a dynamic IP address registers its dynamic IP address along with a receiving mail server code in memory accessible by a dynamic name server. The receiving mail server code is preferably also stored with the domain name for which the receiving mail server receives mail in memory accessible by a private name server. In response to a request for mail delivery, a delivering mail server utilizes the receiving mail server code stored in memory accessible by the private name server and the dynamic name server to determine the dynamic IP address.

17 Claims, 6 Drawing Sheets

OTHER PUBLICATIONS

The NetBIOS Working Group, RFC 1002 "Protocol Standard for NetBIOS Service on a TCP/UDP Transport: Detailed Specifications," Mar. 1987.

Klensin et al., RFC 1869 "SMTP Service Extensions," Nov. 1995.

J. DeWinter, RFC 1985 "SMTP Service Extension for Remote Message Queue Starting," Aug. 1996.

O'Reilley and Associates, *DNS and BIND*, pp. 1–33 and 85–91, Jan. 1997.

"Microsoft Windows NT Server: A Powerful, Manageable, and Scalable Platform for Internet Service Providers," White Paper from http//www.microsoft.com/isn/network/isp/default.asp, Feb. 1998.

"Getting Started: ISP SBS Hosting" for Small Business Server ISP Tools and Documentation, http//www.microsoft.com/isn/techcenter/configuration/default/asp?A=10&B=4, Jun. 11, 1998.

"SBS.INS Process Flow" from Small Business Server ISP Tools and Documentation, http//www.microsoft.com/isn/techcenter/configuration/default.asp?A=10&B=4, Jun. 11, 1998.

"Frequently Asked Questions" from Small Business Server ISP Tools and Documentation, http//www.microsoft.com/isn/techcenter/configuration/default.asp?A=10&B=4, Jun. 11, 1998.

Ryan Waite, "Connecting Microsoft Small Business Server to the Internet," Power Point Presentation, Sep. 1998.

"SMTP Mail Forwarding, Internet Services for Businesses," .html document downloaded from Internet in Aug. 1998.

Vixie et al., "Dynamic Updates in the Domain Name System (RFC 2136)", Apr., 1997. Available from http://ietf.org/rfc/rec2136.txt?number=2136 accessed Aug. 15, 2000.

Northrup, A., *NT Network Plumbing: Routers, Proxies, and Web Services*, IDG Books Worldwide, Inc., 1998, pp. 328–329.

* cited by examiner

| (Resource Domain Name) AXRY14TJLM | (Class) IN | (TTL) | (Type) A | (IP Address) 130.100.100.13 |
|---|---|---|---|---|

| (Resource Domain Name) smallbiz.com | (Class) IN | (TTL) | (Type) MX | (Preference) 0 | (Exchange-dname) AXRY14TJLM |
|---|---|---|---|---|---|

METHODS AND SYSTEMS FOR SECURELY DELIVERING ELECTRONIC MAIL TO HOSTS HAVING DYNAMIC IP ADDRESSES

TECHNICAL FIELD

The present invention relates to methods and systems for securely delivering electronic mail to hosts having dynamic IP addresses. More particularly, the present invention relates to methods and systems for securely delivering electronic mail to mail servers having dynamic IP addresses utilizing the Simple Mail Transfer Protocol (SMTP).

BACKGROUND OF THE INVENTION

Hosts connected to a TCP/IP network communicate with each other using internet protocol (IP) addresses. An IP address is a number uniquely identifying a network connection. Available Internet IP addresses have become limited in number due to inefficient address assignment and an increase in the number of hosts connected to the Internet. As a result, Internet service providers (ISPs) may be unwilling to allocate static IP addresses to customers without charging substantial fees. A static or fixed IP address does not change for a given network connection. For example, each time a customer with a static IP address accesses the Internet through an ISP, the customer has the same IP address. Instead of allocating static IP addresses to customers, some ISPs allocate dynamic IP addresses. A dynamic IP address is temporarily assigned to a user, or, more specifically, to the network connection of a user's machine. For example, when a customer accesses the Internet through an ISP, the customer may be given a dynamic IP address. When the customer terminates the connection with the ISP, the dynamic IP address may be assigned to another customer. When the first customer accesses the Internet a second time through the same ISP, he or she may or may not receive the same IP address used in the first connection. Thus, dynamic IP addresses allow owners of static IP addresses to maximize the value of each address by temporarily allocating the address to multiple customers.

SMTP is the dominant Internet standard for delivering electronic mail. SMTP allows mail for multiple users to be delivered to a single SMTP server. SMTP is an IP-based protocol. In order to deliver electronic mail, a delivering mail server retrieves the IP address of a receiving mail server. The SMTP protocol was designed to route mail to a server permanently connected to a network using a static IP address. Delivering mail to a mail server that randomly connects to a network with a dynamic IP address cannot be done securely using SMTP according to conventional mail delivery techniques. Alternatively, an SMTP server having a dynamic IP address cannot securely retrieve mail. For example, in order for a delivering SMTP server to determine where to deliver electronic mail, the delivering SMTP server determines the IP address of the receiving SMTP server. In order to determine the IP address of the receiving SMTP server, the delivering SMTP server may access a Domain Name System (DNS) server. A DNS server stores a database of resource records containing information relating to hosts, including IP addresses of the hosts.

Determining the IP address of the receiving SMTP server is a two step process. First, the delivering SMTP server queries the DNS server for the name of the receiving SMTP server. The query includes the domain name of the domain for which the receiving SMTP server receives mail. The DNS server searches its resource records for a mail exchange or MX record corresponding to the domain name in the query. An MX record specifies the name of a mail exchanger, i.e., the receiving SMTP server, responsible for receiving mail for a given domain. The DNS server sends an MX record specifying the name of the receiving SMTP server to the delivering SMTP server.

The next step is determining the IP address corresponding to the mail exchanger name specified in the MX record received by the delivering SMTP server. Accordingly, the delivering SMTP server queries the DNS server for the IP address corresponding to the name of the mail exchanger extracted from the MX record. The DNS server stores additional resource records, known as address or A records, that pair IP addresses with host names. Thus, if the DNS server stores the A record for the mail exchanger, the A record is transmitted to the delivering SMTP server, which can then initiate an SMTP connection to the IP address specified by the A record and deliver the mail. However, when the receiving SMTP server has a dynamic IP address, the DNS server may not have the A record for the receiving SMTP server because conventional DNS servers are not dynamically updated when a host receives a dynamic IP address. More particularly, no mechanism exists in the conventional Domain Name System for dynamically or automatically updating A records in a DNS server. Updating may be performed manually, for example, using a keyboard. However, such a process is time-consuming, labor-intensive, and unsuitable in a computing environment where dynamic IP addresses change frequently. Thus, conventional DNS servers may store A records containing static IP addresses only.

Since SMTP was originally designed to route mail between mail servers permanently connected to a network using fixed IP addresses, the fact that conventional DNS servers were not dynamically updatable was of little consequence. Conventional DNS servers stored the A records for the permanently connected mail servers. Mail delivery to the permanently connected mail servers was reasonably secure because delivering mail servers verified the addresses of receiving mail servers by accessing DNS servers before delivering mail. As long as the records stored in the DNS servers were secure, mail delivery occurred to the intended recipients.

However, in order to reduce network access fees, it has become desirable for a receiving mail server not to maintain a permanent connection to a network. For example, a receiving mail server may access a network periodically to retrieve mail queued by a delivering mail server. One conventional mechanism for receiving queued mail for a domain is the SMTP TURN command. In order to retrieve mail using the TURN command, the receiving mail server first establishes an SMTP connection with the delivering mail server. Next, the receiving mail server issues the TURN command followed by the domain name for which the receiving mail server receives mail. The delivering mail server then delivers queued mail for the domain name specified in the TURN command without verifying the IP address of the receiving mail server. The SMTP connection initiated by the receiving mail server is essentially reversed and used by the delivering mail server to deliver mail. The TURN command is not secure because a user can initiate an SMTP connection, issue the TURN command, and retrieve mail for a domain for which he or she is not authorized to retrieve mail.

Because of the security problems associated with the TURN command, the SMTP ETRN command was developed as a more secure method for retrieving queued mail. In order to utilize the ETRN command to retrieve mail, the receiving mail server first initiates an SMTP connection with the delivering mail server. Next, the receiving mail server issues the ETRN command followed by the domain name for which mail delivery is requested. In response to the ETRN command, the delivering mail server queries a DNS server for the mail exchanger and then for the IP address of the mail exchanger. Because the delivering mail server queries the DNS server to determine where to deliver mail, mail retrieval using the ETRN command is more secure than mail retrieval using the TURN command. However, if the receiving mail server has a dynamic IP address, the DNS server may not store the A record for the receiving mail server. As a result, the IP address cannot be determined and mail retrieval using the ETRN command fails. An alternative is to use the TURN command, which is not secure. Thus, according to conventional delivery techniques, electronic mail could not be securely delivered to an SMTP server having a dynamic IP address.

SUMMARY OF THE INVENTION

As used herein, the term "server" refers to a program executing on a machine, such as a computer, and providing shared services to client processes on a network. The computer may include a memory device that stores the server and a processor that executes the server. The computer may also include one or more network adapters, such as Ethernet adapters, that allow the server to communicate with other servers executing on other machines. Alternatively, multiple servers may execute on the same physical machine. However, a server, as described herein, is not intended to be limited to use with or by any particular hardware configuration. In addition, the term "server" is not intended to be limited to a program that always provides services to clients. For example, in some communications, servers may act as clients or peers of other network processes.

In addition, the phrase "delivering mail server" refers to a program that stores and delivers mail to a receiving mail server. The phrase "receiving mail server" refers to a program that requests delivery of queued mail from the delivering mail server. However, neither of these phrases is intended to be limited to a mail server that only delivers or only receives mail. For example, the receiving mail server may deliver mail, and the delivering mail server may receive mail. Thus, the terms "delivering" and "receiving" are intended to describe the functions of the mail servers with regard to a given transaction.

As used herein, the phrase, "receiving mail server code" refers to any string or grouping of alphanumeric characters, digits, and/or symbols preferably arranged so that the receiving mail server code is difficult to determine. The receiving mail server code is utilized to securely deliver electronic mail to a receiving mail server, as described in more detail below.

According to one aspect, the present invention includes one or more name servers in communication with a delivering mail server to securely communicate the dynamic IP address of receiving mail servers to the delivering mail server. A first name server hereinafter referred to as "the dynamic name server" dynamically stores records linking receiving mail server codes of receiving mail servers with dynamic IP addresses of receiving mail servers. A second name server hereinafter referred to as "the private name server" stores records linking the receiving mail server codes with domain names for which the receiving mail servers receive mail. As used herein, the phrase "dynamic name server" refers to any server capable automatically registering records linking receiving mail server codes and dynamic IP addresses of receiving mail servers in response to registration requests received over a network. The phrase "private name server" refers to any name server capable of storing records linking receiving mail server codes to domain names for the receiving mail servers, wherein access to the records is preferably limited, e.g., to a delivering mail server, in order to protect the stored receiving mail server codes. A third name server, hereinafter referred to as, "the public name server" may be used by other mail servers to route mail to the delivering mail server. As used herein, the phrase "public name server" refers to any server that stores records linking domain names mail exchanger names and records linking mail exchanger names to IP addresses, wherein the records are freely accessible to network users. The public name server is not essential to the invention but is nonetheless mentioned for completeness.

According to another aspect, the present invention includes a setup phase, a connection phase, and a mail delivery phase. The setup phase may occur when a new receiving mail server and the domain(s) for which it receives mail are added to a network. The setup phase may include generating a receiving mail server code for the receiving mail server and linking the receiving mail server code with the domain name corresponding to the domain for which the receiving mail, server receives mail. The receiving mail server code and the domain name are preferably registered with a private name server. The receiving mail server code and the domain name are preferably also registered with the receiving mail server.

Next, during the connection phase, the receiving mail server connects to the network and receives a dynamic IP address. During the connection phase, the receiving mail server preferably registers its IP address along with its receiving mail server code with a dynamic name server. The connection phase may occur each time a receiving mail server connects to the network and receives a dynamic IP address.

Next, during the mail retrieval phase, the receiving mail server requests delivery of queued mail from the delivering mail server. The delivering mail server first retrieves the receiving mail server code corresponding to the domain or domains for which the receiving mail server receives mail from the private name server. The delivering mail server then requests the dynamic IP address from the private name server. The private name server determines that it does not have the record containing the IP address, so the private name server queries the dynamic name server for the dynamic IP address. The dynamic name server transmits the dynamic IP address to the private name server. The private name server transmits the dynamic IP address to the delivering mail server. The delivering mail server then creates an SMTP connection to the IP address received from the private name server and then delivers the mail. The mail delivery phase may occur each time the delivering mail server requests delivery of queued mail after connecting to the network and receiving a dynamic IP address.

According to another aspect, the present invention includes a method for securely delivering electronic mail to a receiving mail server having a dynamic IP address. The method includes registering a dynamic IP address and a code of a receiving mail server to which electronic mail is to be delivered in a dynamic name server. In order to retrieve electronic mail, after the registration, the receiving mail server may transmit a request for delivery of electronic mail to a delivering mail server. The delivering mail server may be a remote mail server storing queued messages for the receiving mail server. In order to determine where to deliver the queued mail, the delivering mail server may transmit a request for the dynamic IP address of the receiving mail server to a private name server, such as a DNS server. The private name server may store a database of resource records linking receiving mail server codes with domain names for a plurality of receiving mail servers. However, since the dynamic IP address of the receiving mail server may not be stored in the private name server, the private name server may transmit a request for determining the dynamic IP address to the dynamic name server. The request may include the receiving mail server code. The dynamic name server may extract the dynamic IP address based on the receiving mail server code. The dynamic IP address may then be transmitted to the delivering mail server. The delivering mail server may then deliver the mail to the receiving mail server utilizing the dynamic IP address transmitted from the private name server.

According to another aspect, the present invention may include a system for securely delivering electronic mail to electronic mail servers having dynamic IP addresses. In the system, a delivering mail server receives requests for electronic mail delivery from a plurality of receiving mail servers having dynamic IP addresses via a network. The delivering mail server delivers electronic mail to the plurality of receiving mail servers. A dynamic name server receives and stores receiving mail server codes and corresponding dynamic IP addresses of the receiving mail servers, e.g., during the connection phase when the receiving mail servers are allocated dynamic IP addresses. A private name server may be in communication with the dynamic name server and the delivering mail server for storing the receiving mail server codes and corresponding domain names of the plurality of receiving mail servers. The private name server may access the dynamic name server to determine dynamic IP addresses of the plurality of receiving mail servers.

According to another aspect, the present invention includes a method for securely communicating a dynamic IP address of a receiving mail server to a delivering mail server. The method includes registering a dynamic IP address and a receiving mail server code of a receiving mail server with a dynamic name server. Registering the dynamic IP address may include transmitting a name registration request packet, including the dynamic IP address and the receiving mail server code, from the receiving mail server to the dynamic name server. The receiving mail server code may also be stored with the domain name of the receiving mail server in a private name server in communication with the dynamic name server. In response to a request for the dynamic IP address of the receiving mail server from a delivering mail server, the private name server may extract the receiving mail server code from its records. The private name server may then transmit a request for the dynamic IP address to the dynamic name server. The request may include the receiving mail server code. The dynamic name server, having previously registered the dynamic IP address with the receiving mail server code, extracts the dynamic IP address from its records. The dynamic IP address is then transmitted to the delivering mail server. Transmitting the dynamic IP address to the delivering mail server may include first transmitting the dynamic IP address to the private name server. The private name server may then transmit the dynamic IP address to the delivering mail server.

According to another aspect, the present invention may include a computer-readable medium having computer-executable instructions for performing steps for retrieving mail from a mail server. The steps may include identifying a routeable dynamic IP address received from a network. Next, a receiving mail server code previously stored with the receiving mail server, e.g., during the setup phase, may be retrieved and linked with the dynamic IP address. If the receiving mail server code is encrypted, it is preferably decrypted before being linked with the dynamic IP address. Next, the receiving mail server code and the dynamic IP address may be registered with a dynamic name server. The receiving mail server may then request and receive mail securely.

According to another aspect, the present invention may include a computer-readable medium having stored thereon a data structure. The data structure may include an A record. The A record may include a first data field containing data representing a secret receiving mail server code of a receiving mail server and a second data field containing data representing a dynamic IP address of the receiving mail server.

According to another aspect, the present invention may include a computer-readable medium having stored thereon a data structure. The data structure may include an MX record. The MX record may include a first data field containing data representing a secret receiving mail server code of a receiving mail server and a second data field containing data representing a domain name of a domain for which the receiving mail server receives mail.

BRIEF DESCRIPTION OF THE DRAWINGS

FIG. 4 is a diagram of an exemplary data structure of an A record according to an embodiment of the present invention.

FIG. 5 is a diagram of an exemplary data structure of an MX record according to an embodiment of the present invention.

DETAILED DESCRIPTION OF THE INVENTION

Exemplary Operating Environment

Figure 1:
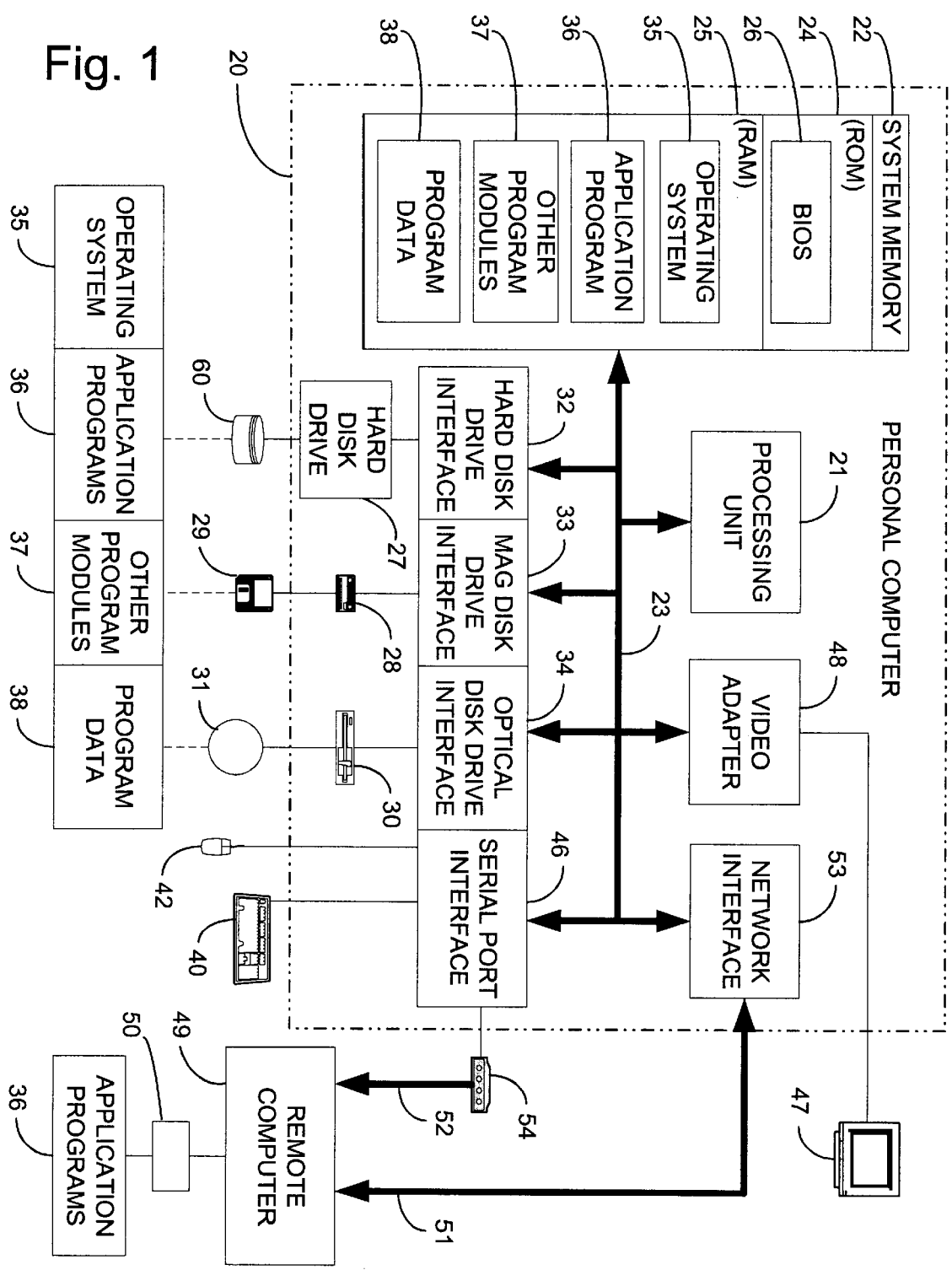
FIG. 1 is a block diagram of an exemplary operating environment for computer-executable instructions according to embodiments of the present invention.
Figure 2:
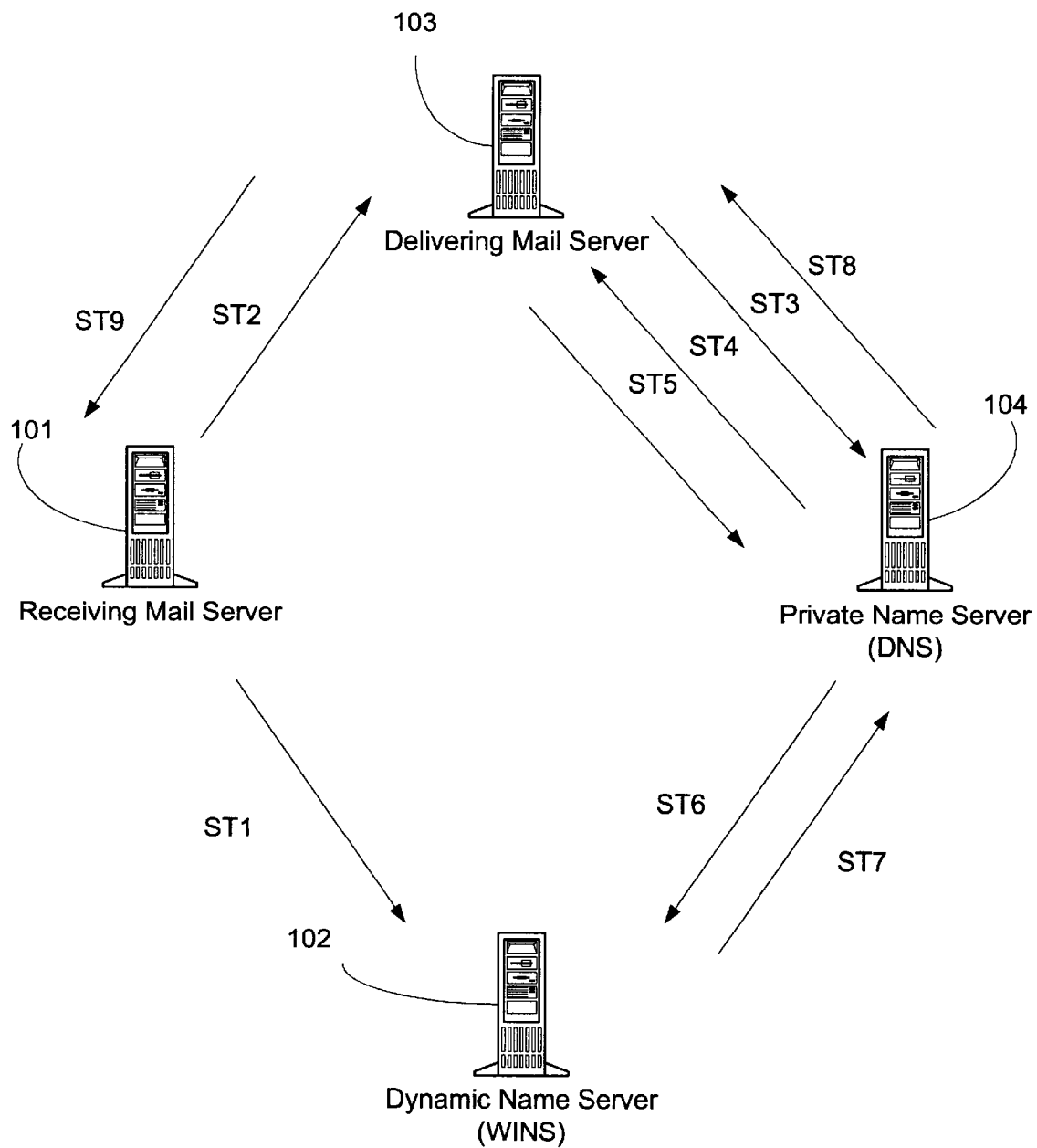
FIG. 2 is a flow diagram of a method and a system for securely delivering electronic mail to a mail server having a dynamic IP address according to an embodiment of the present invention.

FIG. 1 and the following discussion are intended to provide a brief, general description of a suitable computing environment in which the invention may be implemented. For example, embodiments of the present invention may include a receiving mail server 101, a dynamic name server 102, a delivering mail server 103, and a private name server 104, all of which are illustrated in FIG. 2. Any or all of these servers may be implemented in the computing environment illustrated in FIG. 1. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing any of the servers, data structures, or other programs for securely delivering electronic mail to mail servers according to embodiments of the present invention may include a general purpose computing device, such as a conventional personal computer 20. The personal computer 20 may include a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS) containing the basic routines that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Exemplary instructions and data structures that may be stored in these computer readable media according to embodiments of the present invention include mail servers, name servers, receiving mail server codes, IP addresses, MX records, A records, or any other instructions and data structures utilized to securely deliver electronic mail to mail servers having dynamic IP addresses. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, such as mail servers and name servers according to embodiments of the present invention, other program modules 37, and program data 38, such as dynamic IP addresses, domain names, and receiving mail server codes according to embodiments of the present invention. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected to the processing unit 21 by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. For example, the personal computer 20 may embody a receiving mail server and the remote computer 49 may embody a delivering mail server. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. The network interface 53 may be connected to a cable modem or ADSL device. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. Thus, any of the servers, such as the name servers or the mail servers according to embodiments of the present invention, may store program data, such as receiving mail server codes, domain names, and IP addresses, in remote memory storage devices. It will be appreciated that the network connections shown are exemplary and other means of establishing a communications link between the computers may be used.

Figure 3:
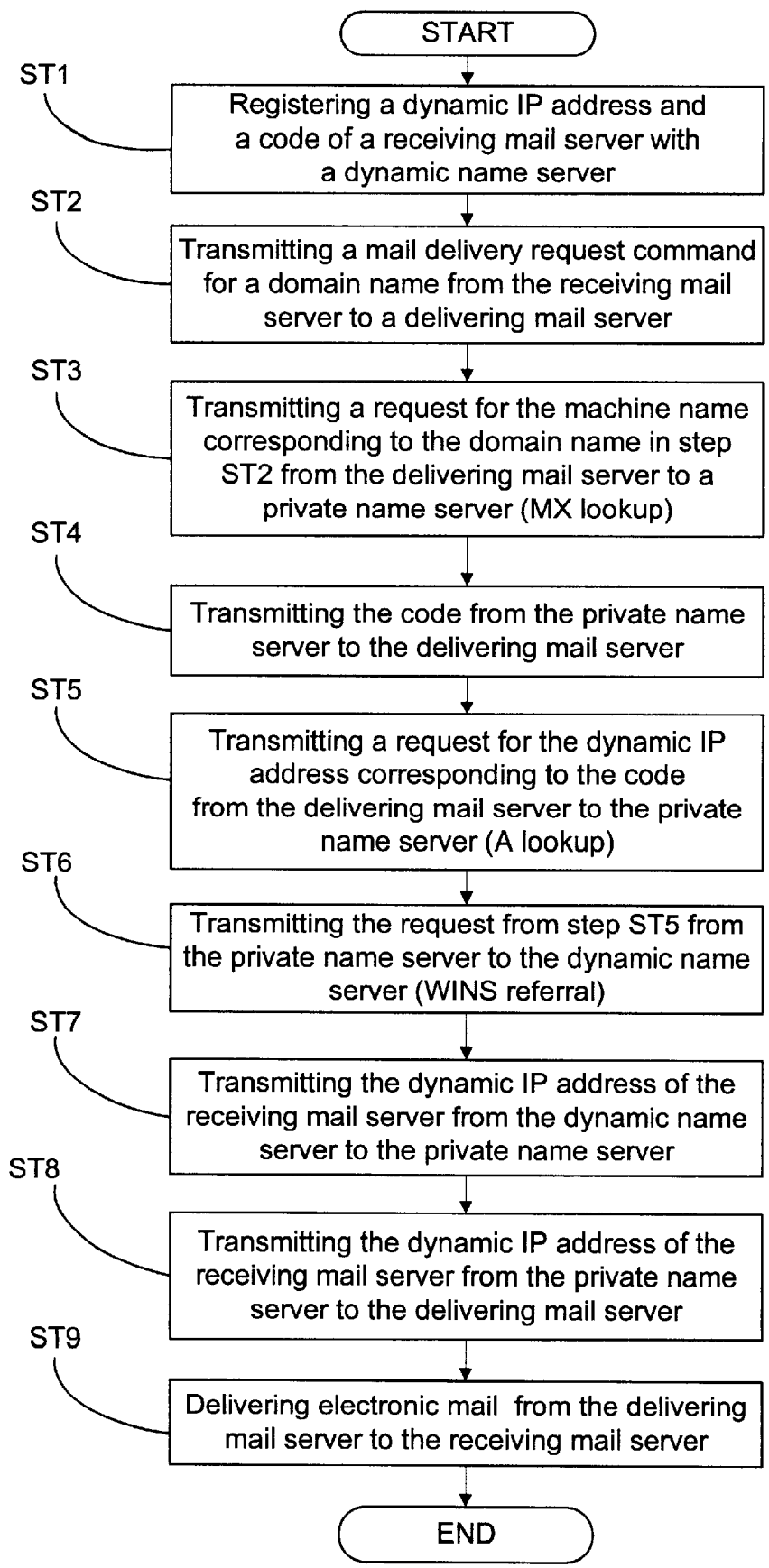
FIG. 3 is a flow chart of a process for securely delivering electronic mail to a mail server having a dynamic IP address according to an embodiment of the present invention.

FIGS. 2 and 3 illustrate a process, e.g., a set of computer executable instructions, for secure delivery of electronic mail to a mail server having a dynamic IP address according to an embodiment of the present invention. The instructions illustrated in FIGS. 2 and 3 may be stored on a computer-readable medium, for example, any of the computer-readable media illustrated in FIG. 1. In FIG. 2, a receiving mail server 101, such as an SMTP server, may receive a dynamic IP address, for example, when the receiving mail server accesses a network, such as the Internet. According to an important aspect of the invention, the receiving mail server 101 preferably registers the dynamic IP address along with a receiving mail server code with a dynamic name server 102. (Step ST1) The registration may occur during the connection phase when the receiving mail server accesses the network. The receiving mail server code registered with the dynamic name server 102 is preferably secret, i.e., structured and stored to reduce the likelihood of discovery by someone attempting to impersonate the receiving mail server 101 and steal electronic mail. The generation and storage of an exemplary receiving mail server code are discussed in more detail below.

In a preferred embodiment, the dynamic name server 102 comprises a dynamically updatable name server, such as a "Windows" Internet Name Service (WINS) server. The present invention is not limited to registering the receiving mail server code and the dynamic IP address of the receiving mail server 101 with a WINS server. Any server capable of dynamically updating a database of receiving mail server codes and IP addresses is within the scope of the invention. Using a WINS server is preferred because WINS servers allow users to dynamically register receiving mail server codes and dynamic IP addresses by transmitting a name registration request, including a receiving mail server code and a dynamic IP address, to the WINS server. Thus, unlike conventional DNS servers, WINS servers are capable of maintaining a dynamically updated database of receiving mail server codes and dynamic IP addresses. WINS servers are conventionally used in small business computer networks to allow users to self-register machine names and IP addresses and communicate with other users connected to the small business computer network. In the present embodiment, rather than storing machine names and IP addresses of machines in a local network, the dynamic name server 102 stores receiving mail server codes and dynamic IP addresses for secure delivery of electronic mail to remote mail servers. Moreover, unlike the conventional use of the WINS server, access to the records storing the receiving mail server codes may be limited to prevent unauthorized discovery of the receiving mail server codes. In an alternative embodiment, the dynamic name server 102 may comprise a dynamic DNS server.

After registering the receiving mail server code and the dynamic IP address with the dynamic name server 102, the receiving mail server 101 may request mail delivery for a domain name from a delivering mail server 103 for example, using SMTP. (Step ST2) In response to the request for mail delivery, the delivering mail server 103 transmits a request for the name of the mail server that receives mail for the domain name received in ST2 to a private name server 104. (Step ST3) The private name server 104 is preferably a DNS server. However, instead of storing a record mapping the machine name of the receiving mail server 101 with a domain, the private name server 104 stores a record linking the receiving mail server code and the domain name of a domain for which the receiving mail server receives mail. Multiple domain names can be linked with the same receiving mail server code. This record may be created and stored at some time prior to the request for mail delivery, for example, when the owner of the receiving mail server 101 contracts for services from the owner of the delivering mail server 103, i.e., during the setup phase. The private name server 104 then transmits the record linking the domain name and the receiving mail server code to the delivering mail server 103. (Step ST4) The delivering mail server 103 transmits a request for the dynamic IP address corresponding to the receiving mail server code to the private name server 104. (Step ST5) The private name server 104 may not store a record linking the IP address of the receiving mail server 101 with the receiving mail server code, since the receiving mail server 101 has a dynamic IP address. Once the private name server 104 determines that it does not have the record linking the receiving mail server code with the dynamic IP address, the private name server requests the record from the dynamic name server 102 (Step ST6). The dynamic name server 102, having stored the dynamic IP address and the receiving mail server code during the registration, extracts the record containing the dynamic IP address and transmits the record containing the IP address of the receiving mail server 101 to the private name server 104. (Step ST7) The private name server 104 transmits the record including the dynamic IP address of the receiving mail server 101 to the delivering mail server 103. (Step ST8) Finally, the delivering mail server 103 delivers electronic mail to the receiving mail server 101. (Step ST9) Thus, electronic mail can be securely delivered to a mail server, even when the mail server has a dynamic IP address. The delivery is secure because the receiving mail server code stored by the name servers and the receiving mail server is preferably secret. An unauthorized user cannot impersonate the receiving mail server and receive mail without knowing the receiving mail server code.

Each of the steps in FIG. 3 is discussed in more detail below. In Step ST1, the receiving mail server 101 registers a dynamic IP address and a receiving mail server code with the dynamic name server 102. The receiving mail server code may be any combination of alphanumeric characters, digits, and/or symbols that are preferably arranged so that the receiving mail server code is difficult to determine. For example, the receiving mail server code may comprise a random or pseudo-random string of characters, such as "AXRY14TJLM." Alternatively, the receiving mail server code may comprise a pure binary value that does not translate into alphanumeric characters. The length of the receiving mail server code may vary according to the desired level of security. For example, the longer the receiving mail server code, the more difficult the receiving mail server code is to determine through iterative techniques. In this example, the receiving mail server code is a tencharacter string.

The receiving mail server code may be generated by the receiving mail server 101, the delivering mail server 103, or by any program in communication with the receiving mail server 101 or the delivering mail server 103. For example, the receiving mail server code may be generated by a program executing on a machine at an ISP and downloaded to the receiving mail server 101 the first time that the receiving mail server 101 connects to the ISP, e.g., during the setup phase. Alternatively, the receiving mail server may include the program for generating the receiving mail server code and upload the receiving mail server code to the ISP when the receiving mail server 101 connects to the ISP for the first time. The program or algorithm for generating the receiving mail server code may comprise any suitable algorithm for generating a code having the characteristics described above. For example, the algorithm may comprise a random or pseudo-random number generation algorithm. Once the receiving mail server code is generated, the receiving mail server code is preferably stored by the receiving mail server 101, e.g., in memory accessible by the receiving mail server 101, to be used in the receiving mail server code registration process.

In order to register the receiving mail server code and the dynamic IP address with the dynamic name server 102, the receiving mail server 101 preferably constructs a packet of registration data in a format recognizable by the dynamic name server 102. If the dynamic name server 102 is a WINS server, the packet may be a name registration request. In general, a name registration request includes a header section, a question section, and a resource record section. Details of the structure of the header section and the question section are described in Request For Comments (RFC) 1002, entitled, "Protocol Standard For NetBIOS Service on a TCP/UDP Transport: Detailed Specifications," by The NetBIOS Working Group (March 1987), the disclosure of which is incorporated herein by reference. The resource record section contains the data being registered with the dynamic name server 102. Since the data being registered includes the dynamic IP address of the receiving mail server 101, the resource record is an address or A record.

FIG. 4 illustrates an exemplary data structure for an A record according to an embodiment of the present invention. The data structure illustrated in FIG. 4 may be embodied in any computer-readable medium, for example, any of the computer-readable media illustrated in FIG. 1. In FIG. 4, the words in parenthesis indicate the field names for each block of the A record. The characters under each field name indicate textual representations of data, which may be stored in each field according to the present embodiment. For example, block 130 represents the Resource Domain Name field. The Resource Domain Name field is traditionally used to store the domain name of the machine to which the record pertains. For instance, if the name of the receiving mail server is "mailbox" and the domain to which the machine is connected is "smallbiz.com," then the Resource Domain Name field may store "mailbox.smallbiz.com." In the illustrated embodiment, the Resource Domain Name field stores the receiving mail server code, for example, "AXRY14TJLM." Block 138 represents the IP address field for storing the IP address corresponding to the name in block 130. In the illustrated embodiment, block 138 stores the dynamic IP address of the receiving mail server, for example, "131.100.100.13." Block 136 represents the Type field indicating the type of data contained in the resource record. For an A record, the Type field contains the character "A," representing "Address." Blocks 132 and 134 respectively represent the Network Class field and the Time to Live field of the A record. The values in these blocks are not essential to the invention. For purposes of the examples used to illustrate the present embodiment, the characters "IN" for Internet class are used for the Network Class field, and the Time to Live field is blank, since it is optional. Thus, the textural representation of an exemplary A record stored in the dynamic name server 102 according to the present embodiment using the receiving mail server code and the dynamic IP address of the receiving mail server 101 may be as follows:

AXRY14TJLM IN A 131.100.100.13.

The dynamic name server 102 preferably maintains a dynamically updated database of A records containing receiving mail server codes and dynamic IP addresses of a plurality of receiving mail servers.

The present invention is not limited to linking dynamic IP addresses with receiving mail server codes using A records. Any data structure for linking a dynamic IP address with a receiving mail server code is within the scope of the invention. In addition, the present invention is not limited to storing the records linking IP addresses and receiving mail server codes in a WINS server. Any type of server capable of dynamically registering records linking receiving mail server codes with dynamic IP addresses is within the scope of the invention.

In Step ST2, the receiving mail server 101 transmits a mail delivery request command to the delivering mail server 103. In a preferred embodiment of the invention, the mail delivery request command is the SMTP ETRN command. As discussed above, the ETRN command was developed to allow remote users to receive queued mail over a transient connection to an ISP. The ETRN command is an Internet standard for remote delivery of queued mail. The ETRN command instructs the delivering mail server 103 to establish a separate SMTP connection with the receiving mail server 101 to deliver mail, rather than reversing the mail delivery request connection. Establishing a separate connection enhances security because the delivering mail server accesses a name server to determine where to deliver the mail, instead of relying on a name provided by an unknown requester. For example, prior to the ETRN command, some mail servers used the SMTP TURN command to receive queued mail. The TURN command is not secure because the delivering mail server does not access a DNS server to verify the name of the receiving mail server. For example, after establishing an SMTP connection with an SMTP mail server, a user may enter the command "TURN smallbiz.com." The delivering mail server then delivers all mail intended for smallbiz.com to the user's IP address without extracting the MX record from a DNS server to determine whether the user is a mail server authorized to receive mail for smallbiz.com. The ETRN command is an improvement over the TURN command because the delivering mail server accesses a domain name server to determine the name of the mail exchanger authorized to receive mail for a domain. However, prior to the present invention, mail delivery using the SMTP ETRN command could not be performed unless the receiving mail server had a static IP address because conventional DNS servers may not be updated when a receiving SMTP server receives a dynamic IP address.

The present invention is not limited to using the ETRN command to start delivery of queued mail. Any command that causes the delivering mail server to perform name verification before delivering mail is within the scope of the invention.

In step ST3, the delivering mail server 103 requests the name of the mail exchanger authorized to receive mail for the domain specified in the ETRN command. As discussed above, according to SMTP, the delivering mail server 103 requests the MX record to determine the name of the receiving mail server 101. FIG. 5 shows an exemplary format of an MX record according to the present embodiment. The data structure illustrated in FIG. 5 may be embodied in a computer-readable medium, for example, any of the computer-readable media illustrated in FIG. 1. In FIG. 5, the words in parenthesis inside each block indicate the field types for the MX record. The characters under each block illustrate exemplary data in textual format for each field according to the present embodiment. Block 150 indicates the Exchange-Dname field. This field is conventionally used to store the domain name of the mail exchanger, i.e., the receiving mail server. However, according to the present embodiment, block 150 is used to store the receiving mail server code corresponding to the dynamic IP address, for example, "AXRY14TJLM." Block 140 represents the Resource Domain Name field. This field stores the domain name of the domain for which the receiving mail server handles mail, e.g., smallbiz.com. Block 142 represents the Class field. For purposes of the present example, the Class field is assumed to be IN or Internet. Block 144 represents the Time to Live field. The Time to Live field is used for caching. The Time to Live field is not essential in explaining the present embodiment, and is left blank. Block 46 represents the Preference field. The Preference field stores a numeric priority value that allows the delivering mail server to select among multiple MX records when multiple mail exchangers deliver mail for a domain. The preference value is not important in explaining the present embodiment, since only one receiving mail machine has been described. Thus, in the illustrated embodiment, the preference value is set to 0. An example of an MX record in textual format according to the present embodiment may be as follows:

smallbiz.com. IN MX 0 AXRY14TJLM

The MX record according to the present embodiment may be stored in the private name server 104 at any time prior to the request for mail delivery. For example, the MX record may be stored when the owner of the receiving mail server 101 contracts for services with the owner of the delivering mail server 103 and the receiving mail server is added to the network, i.e., during the setup phase. The private name server 104 performs a search of its MX records for the MX record corresponding to the domain for which the receiving mail server 101 receives mail. After locating the MX record, the private name server 104 transmits the MX record including the receiving mail server code to the delivering mail server 103 (Step ST4).

The present invention is not limited to using MX records to link receiving mail server codes with domain names of receiving mail servers. Any data structure for linking the receiving mail server codes and the domain names is within the scope of the invention.

After receiving the MX record, the delivering mail server 103 queries the private name server for the A record corresponding to the receiving mail server code in the MX record. (Step ST5) The private name server 104 performs a search of its resource records, for example, using the receiving mail server code specified in the request received from the delivering mail server 103. However, since the receiving mail server 101 has a dynamic IP address, the private name server 104 may not store an A record for the receiving mail server 101. The private name server 104 preferably does, however, store a record that points to the dynamic name server 102 for A records that it does not contain. When the dynamic name server 102 comprises a WINS server, the record is known as a WINS record. The private name server 104 thus queries the dynamic name server 102 for the A record. (Step ST6) An exemplary format for the query is the name query request, as described in RFC 1002. The dynamic name server 102 stores the A record including the receiving mail server code and the dynamic IP address because the A record was previously registered in Step ST1 by the receiving mail server 101. Thus, the dynamic name server 102 locates the A record, for example, by executing a look-up algorithm of its A records using the receiving mail server code received in the query from the dynamic name server 102. The dynamic name server 102 then transmits the A record including the dynamic IP address and the receiving mail server code to the private name server 104. (Step ST7) The private name server 104 delivers the A record to the delivering mail server 103. (Step ST8) The delivering mail server 103 then establishes an SMTP connection with the machine corresponding to the dynamic IP address specified by the A record and delivers mail to that machine. (Step ST9) Since the receiving mail server code and the dynamic IP address were registered by the receiving mail server 101, the mail reaches its intended destination.

Mail delivery following receipt of the dynamic IP address preferably follows the Simple Mail Transfer Protocol, as described, for example, in RFC 821, entitled "Simple Mail Transfer Protocol," by Jonathan Postel (August 1982), the disclosure of which is incorporated herein by reference. The present invention is not limited to the Simple Mail Transport Protocol as defined in RFC 821. For example, SMTP mail delivery according to the present invention may include any extensions and modifications of the basic protocol, for example, extensions and modifications pursuant to RFC 1869, entitled, "SMTP Service Extensions," by J. Klensin et al. (November 1995), the disclosure of which is also incorporated herein by reference.

After receiving mail, the receiving mail server 101 may unregister the A record containing the receiving mail server code from the dynamic name server 102 to reduce the likelihood of discovery of the receiving mail server code. Thus, if the dynamic name server is compromised, only receiving mail server codes being used in pending mail transactions are discoverable. An exemplary command for unregistering data from a WINS server is the name overwrite request described in RFC 1002. Because the receiving mail server code is preferably secret and a separate SMTP connection is established to deliver the mail, mail delivery is secure.

Figure 6:
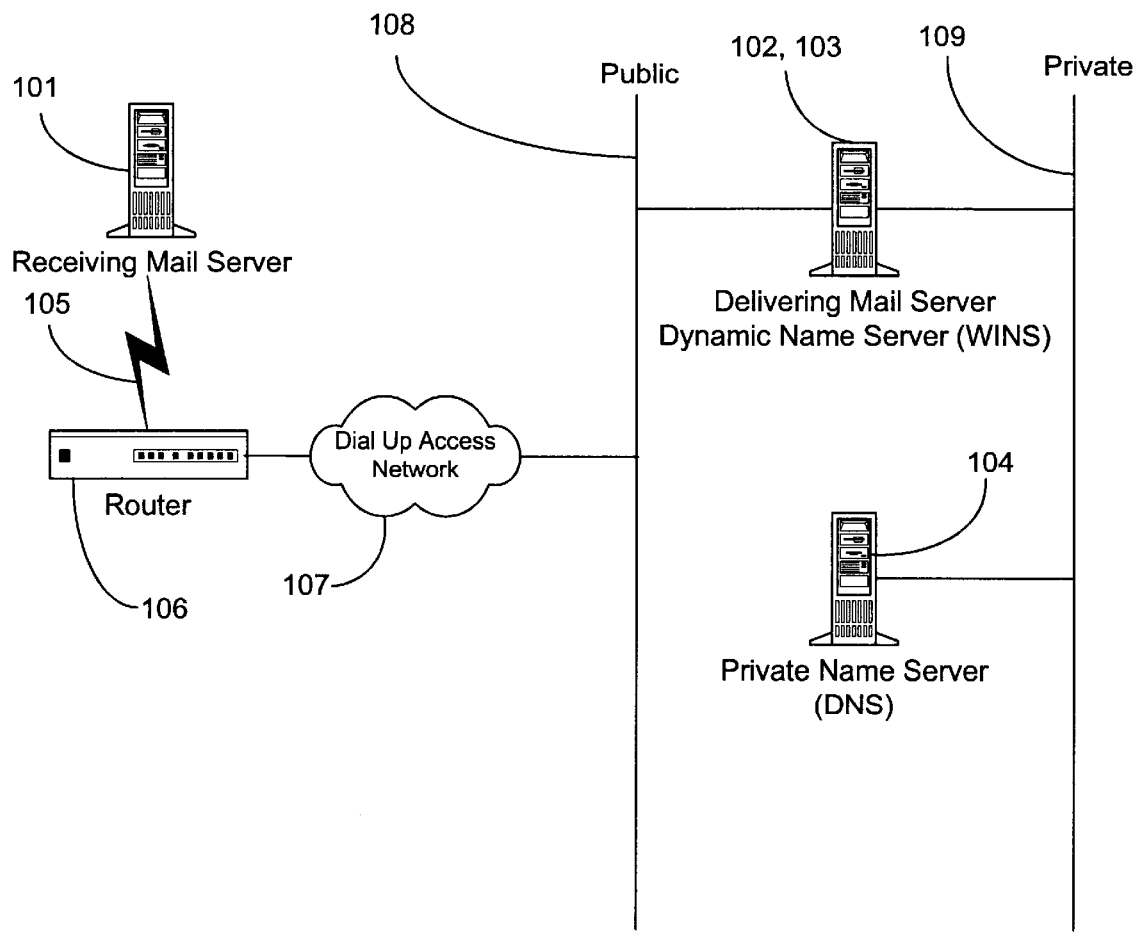
FIG. 6 is a network diagram of a system for securely delivering electronic mail to a mail server having a dynamic IP address according to an embodiment of the present invention.

FIG. 6 is a network diagram illustrating an exemplary system for securely delivering electronic mail to mail servers having dynamic IP addresses according to an embodiment of the present invention. In the illustrated embodiment, the system includes a dynamic name server 102 including a first interface in communication with a public network 108, such as the Internet, and a second interface in communication with a private network 109. The dynamic name server 102 is preferably a dynamically updatable server, such as a WINS server. The dynamic name server 102 registers dynamic IP addresses and corresponding receiving mail server codes from receiving mail servers, such as the receiving mail server 101. The dynamic name server 102 preferably stores the receiving mail server codes and the corresponding IP addresses as A records. A private name server 104 includes a first interface coupled to the second interface of the dynamic name server 102 via the private network 109. The private name server 104 preferably comprises a DNS server. The private name server 104 stores records, preferably MX records, pairing the receiving mail server codes stored by the dynamic name server 102 with domain names. The private name server 104 is preferably hidden from the public network 108 to enhance the security of the receiving mail server codes. A delivering mail server 103 includes a first interface in communication with the public network 108 and a second interface in communication with the private network 109 to deliver mail to the receiving mail server 101 via the public network 108. The delivering mail server 103 may also communicate with additional private or public networks to deliver mail to a plurality of receiving mail servers. The delivering mail server 103 is preferably an SMTP server. In the illustrated embodiment, the dynamic name server 102 and the delivering mail server 103 execute on the same machine.

In order to retrieve mail, the receiving mail server 101 may access the public network 108 through any suitable means, for example, using a modem. The modem may access a communication link 105, such as the public telephone network. A network access server, such as a router 106, including a modem or a plurality of modems, receives calls from mail servers requesting mail delivery. Thus, one of the modems of the router 106 may receive the call from the receiving mail server 101 over the communication link 105. A dialup access network 107 may provide a password authentication service before allowing customer access to the public network 108. Thus, the dialup access network 107 may connect the receiving mail server 101 to the public network 108 only after verifying a password. In an alternative arrangement, customers may connect to the delivering mail server through a private network (not shown), i.e., a network that is not accessible to non-subscribers of the private network. Once connected to the public network 108, the receiving mail server 101 may receive a dynamic IP address and request delivery of electronic mail.

The dynamic and private name servers 102 and 104, the delivering mail server 103, the router 106, and the dialup access network 107 may be managed by an ISP providing electronic mail and Internet services to remote customers. Additional servers, such as public name servers, may communicate with the other servers at the ISP through the public and private networks. These servers are not essential in explaining the present embodiment and are therefore not shown in FIG. 6. The receiving mail server 101 may be located remotely from the ISP, for example, at a company receiving Internet and electronic mail service from the ISP. However, the present invention is not limited to any particular location of the receiving mail server 101.

As stated above, the private name server 104 that stores the MX records pairing the receiving mail server codes and the receiving mail server domain names is preferably hidden from, i.e., not directly connected to, the public network 108. In the illustrated embodiment, the delivering mail server 103 and the dynamic name server 102 are connected to the public network 108. In order to reduce the likelihood of a security breach of the private name server 104, the delivering mail server 103 and the dynamic name server 102 preferably respond to a limited set of commands, e.g., name registration requests and ETRN commands, received from the public network 108. In order to further enhance the security of the receiving mail server codes stored in the private name server 104, a firewall server may be provided at any logical location between the private name server 104 and the public network 108, for example, between the delivering mail server 103 and the public network 108. In addition, the private name server 104 may be directly connected to the public network 108 through the firewall. Implementations of firewall servers, which may be suitable, include packet filters, stateful inspection filters, and combinations of packet and stateful inspection filters. Any type of firewall server for protecting the stored receiving mail server codes is within the scope of the invention. In addition, to further enhance security, the receiving mail server codes stored in the private name server 104, the dynamic name server 102, and/or the receiving mail server 101 may be encrypted.

The present invention is not limited to the embodiment illustrated in FIG. 6. For example, because TCP/IP application level communications occur on different logical ports of a machine, the delivering mail server 103, the dynamic name server 102, and the private name server 104 may execute on the same physical machine. In another alternative, each of the servers may execute on separate machines to enhance processing speed. Any combination of servers and machines is within the scope of the invention.

The following example illustrates how a receiving mail server connected to a small business computer network having a domain name of smallbiz.com may utilize the system of FIG. 6 to securely retrieve electronic mail. First, when the owner of the receiving mail server 101 contracts with the Internet service provider, the Internet service provider may generate the receiving mail server code and store the receiving mail server code in an MX record including the domain name smallbiz.com in the private name server 104. The receiving mail server code is preferably also stored in memory accessible by the receiving mail server 101 to be used in secure mail transactions. For example, the receiving mail server code may be downloaded with the customer's Internet access software. In order to retrieve mail, the receiving mail server 101 connects to the public network 108 through any suitable means, for example, using a modem, as described above. In order to communicate with other machines connected to the public network 108, the receiving mail server preferably receives an IP address. Because available IP addresses may be limited, the receiving mail server may receive a dynamic IP address, for example, from a dynamic host configuration protocol (DHCP) server or a RADIUS server located at the Internet service provider. In this example, it is assumed that the receiving mail server 101 is given a dynamic IP address of 131.100.100.13.

Figure 7:
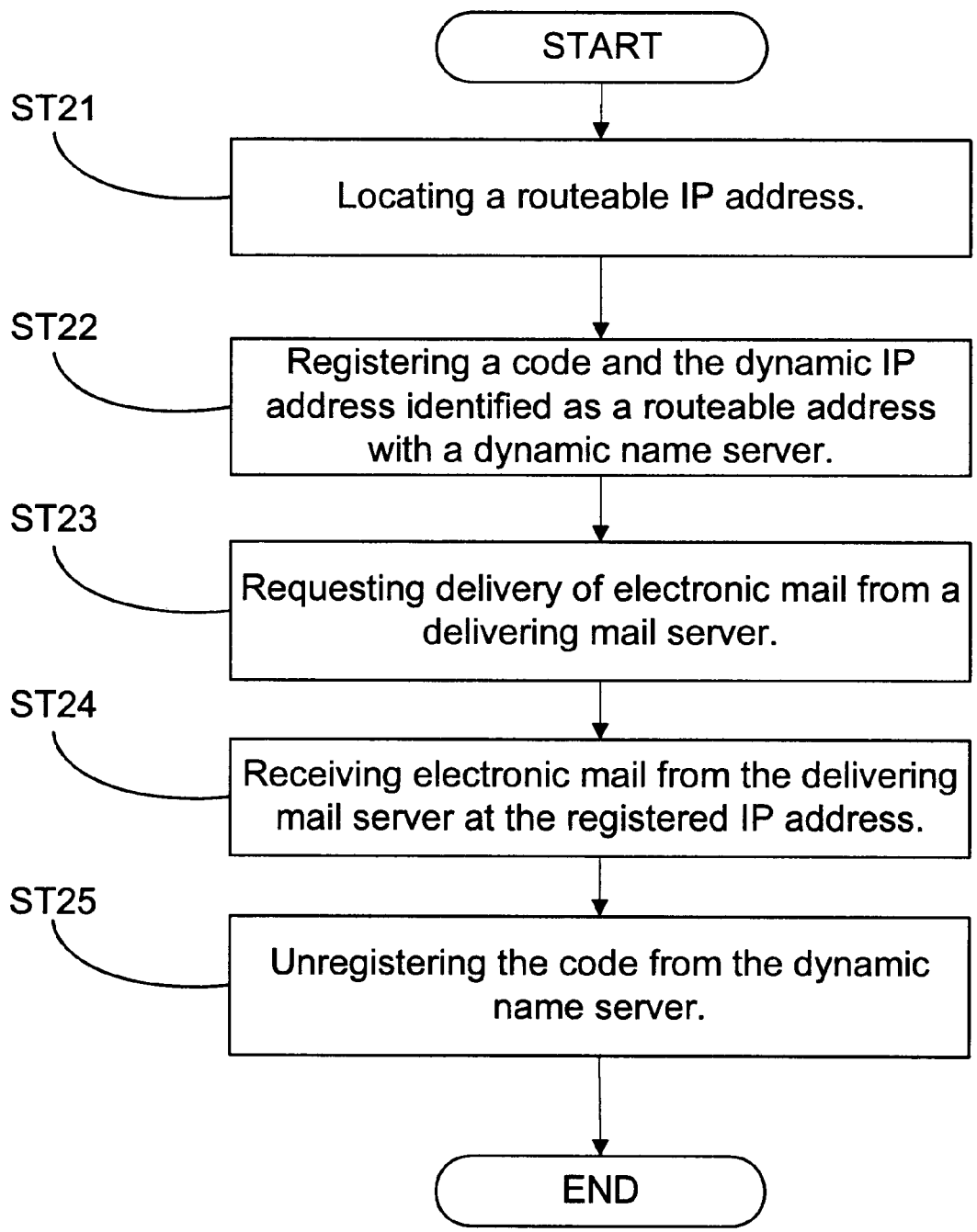
FIG. 7 is a flow chart illustrating an exemplary process that may be performed by a receiving mail server to retrieve electronic mail after receiving a dynamic IP address according to an embodiment of the present invention.

After receiving the dynamic IP address, the receiving mail server 101 executes a program for retrieving its mail. FIG. 7 illustrates exemplary steps which may be performed by the receiving mail server 101 after receiving a dynamic IP address in order to securely retrieve electronic mail. The steps may are preferably computer-executable instructions, i.e., a program, embodied in a computer-readable medium, for example, any of the computer-readable media illustrated in FIG. 1. In order to retrieve mail, the program evaluates network interfaces of the receiving mail server to identify a valid Internet address. (Step ST21) Nonrouteable default IP addresses, which may have been stored by the receiving mail server 101 for use in local area network communications, are preferably ignored. When the program locates the dynamic IP address received from the Internet service provider, that address is selected as the address for mail communications, provided it is a routeable Internet address.

After locating the dynamic IP address, the receiving mail server 101 sends a name registration request to the dynamic name server 102 at the ISP. (Step ST22) The name registration request includes the dynamic IP address and a receiving mail server code. The dynamic name server 102 stores the A record including the dynamic IP address and the receiving mail server code.

After sending the name registration request, the receiving mail server 101 may request delivery of electronic mail. (Step ST23) First, the receiving mail server 101 establishes an SMTP connection with the delivering mail server 103, for example, using logical port 25. After establishing the connection, the receiving mail server 101 may transmit the SMTP command "EHLO" to identify the receiving mail server 101 and determine SMTP commands supported by the delivering mail server 103. The delivering mail server 103 responds by sending a list of SMTP commands that the delivering mail server 103 supports. After receiving the list of commands, the receiving mail server 101 transmits the command "ETRN smallbiz.com." In response, the delivering mail server 103 first queries the private name server 104 for the MX record to identify the name of the mail server responsible for receiving mail for smallbiz.com. In this example, the private name server 104 may respond by transmitting the MX record, "smallbiz.com. IN MX 0 AXRY14TJLM" to the delivering mail server 103. Alternatively, the private name server may transmit only the receiving mail server code to the delivering mail server 102. The delivering mail server 103 then queries the private name server 104 for the A record corresponding to AXRY14TJLM. The private name server 104 does not have an A record for AXRY14TJLM. However, the private name server 104 may store a WINS record pointing to the dynamic name server 102. The private name server 104 queries the dynamic name server 102 for the A record for AXRY14TJLM. This process is known as a WINS referral. The dynamic name server 102 may respond by transmitting the A record "AXRY14TJLM IN A 131.100.100.13." to the private name server 104. The private name server 104 transmits the A record to the delivering mail server 103. The delivering mail server 103 establishes an SMTP connection to machine located at the IP address 131.100.100.13 and delivers the mail to that machine. The receiving mail server 101 may then receive the mail (Step ST24) and distribute the mail to users of its site. Thus, secure delivery of electronic mail to a mail server having a dynamic IP address is achieved. Because the receiving mail server code is preferably secret, unauthorized users cannot impersonate the receiving mail server 101 and steal electronic mail. For example, without knowing the receiving mail server code, a user cannot register the receiving mail server code and the user's IP address with the dynamic name server 102. Moreover, as discussed above, the receiving mail server preferably unregisters the receiving mail server code and the dynamic IP address after receiving mail. (Step ST25)

While the invention has been described in some detail by way of illustration and example, it should be understood that the invention is susceptible to various modifications and alternative forms, and is not restricted to the specific embodiments set forth. It should be understood that these specific embodiments are not intended to limit the invention but, on the contrary, the intention is to cover all modifications, equivalents, and alternatives falling within the spirit and scope of the invention.

What is claimed is:

1. A system for securely delivering electronic mail to a mail server, wherein the mail server has a dynamically assigned IP address and is communicatively linked to a public network, the system comprising:
    a first name server comprising a memory having stored therein a first record containing the mail server's dynamically assigned IP address and the secret code, wherein the first name server is communicatively linked to the public network; and
    a second name server in communication with the first name server over a private network, the second name server comprising a memory having stored therein a second record containing the mail server's domain name and a secret code associated with the mail server,
    wherein the first name server executes one or more programs for performing steps comprising:
        receiving the secret code from the second name server;
        referencing the memory of the first name server to determine the IP address that is associated with the secret code received from the second name server; and
        transmitting, to the second name server, the IP address determined to be associated with the secret code received from the second name server;
    and wherein the second name server executes one or more programs for performing steps comprising:
        receiving, from a requestor, a request for the dynamically assigned IP address of the mail server;
        referencing the data stored in the memory of the second name server to determine the secret code value that is associated with the mail server;
        transmitting, via the private network, the secret code to the first name server,
        in response to transmitting the secret code value to the first name server, receiving, from the first name server, the IP address of the mail server;
        transmitting the dynamically assigned IP address of the mail server to the requester, thereby allowing the requestor to transmit email to the mail server.

2. The system of claim 1, wherein the mail server is a first mail server, and the system further comprises:
    a second mail server in communication with the first mail server and the second name server, the second mail server being operative to transmit the domain name of the first mail server to the second name server when the first mail server requests mail from the second mail server, and wherein the second name server is operative to respond by transmitting the secret code contained in the second record to the first name server to determine the first mail server's dynamically assigned IP address.

3. The system of claim 2, wherein the first name server is operative to respond to the transmission of the secret code by transmitting the dynamically assigned IP address contained in the first record to the second name server.

4. The system of claim 3, wherein the first name server is operative to receive a registration of the secret code and its dynamically assigned IP address from the first mail server, and the first name server is operative to store the dynamically assigned IP address along with the secret code in the first record.

5. A method for securely delivering electronic mail to mail servers, the method comprising:
    assigning a different secret code value to each of a plurality of receiving mail servers, wherein the secret code value identifies the receiving mail server to which it is assigned;
    storing, in a memory of a first computer, data that associates the secret code value of each respective receiving mail server of the plurality of receiving mail servers with the respective receiving mail server's IP address;
    storing, in a memory of a second computer, data that associates the secret code value of each respective receiving mail server of the plurality of receiving mail servers with the respective receiving mail server's domain name;
    at the first computer:
        receiving the secret code from the second computer;
        referencing the data stored in the memory of the first computer to determine the IP address that it associated with the secret code value received from the second computer; and
        transmitting, to the second computer, the IP address determined to be associated with the secret code value received from the second computer;
    at the second computer:
        receiving, from a delivering mail server, the domain name of a receiving mail server of the plurality of receiving mail servers;
        referencing the data stored in the memory of the second computer to determine the secret code value that is associated with the domain name received from the delivering mail server;
        transmitting, to the first computer, the secret code value that is determined to be associated with the domain name received from the delivering mail server;
        in response to transmitting the secret code value to the first computer, receiving, from the first computer, the IP address of the receiving mail server; and
        transmitting, to the delivering mail server, the IP address received from the second computer, thereby allowing the delivering mail server to deliver electronic mail to the receiving mail server.

6. A computer-readable medium having stored thereon computer-executable instructions for performing the method of claim 5.

7. The method of claim 5, wherein the secret code value is a string of characters.

8. The method of claim 5, wherein the secret code value is a string comprising numbers and letters.

9. The method of claim 5, wherein the secret code value is a binary value.

10. The method of claim 5, further comprising:
whenever the receiving mail server has a new IP address, receiving, at the first computer, a message from the receiving mail server, the message comprising the secret code assigned to the receiving mail server and the new IP address; and
storing, in the memory of the first computer, data that associates the secret code value of the receiving mail server with the receiving mail server's new IP address.

11. A system for securely delivering electronic mail to a mail server, the mail server having a secret code value that uniquely identifies it, the system comprising:
a first computer;
a first memory accessible by the first computer;
a second computer in communication with the first computer;
a second memory accessible by the second computer;
one or more programs executing on the first computer for performing steps comprising:
storing, in the first memory, data that associates the secret code value of the mail server with its IP address;
receiving the secret code from the second computer;
upon receiving the secret code value from the second computer, referencing the data stored in the memory of the first computer to determine the IP address that is associated with the secret code, and providing the IP address of the mail server to the second computer; and
one or more programs executing on the second computer for performing steps comprising:
storing, in the second memory, data that associates the secret code value with the mail server's domain name; and
upon receiving the mail server's domain name from a third computer, sending the secret code value to the first computer, receiving the IP address of the mail server in response, and providing the received IP address to the third computer.

12. The system of claim 11, wherein the one or more programs executing on the first computer perform the further steps of:
receiving, from the mail server, a notification of a newly assigned IP address for the mail server; and
creating an association between the secret code value of the mail server and the newly assigned IP address.

13. The system of claim 12, wherein:
the data stored on the first computer associating the secret code value of the mail server with the IP address of the mail server is in the form of a first record having at least a first and a second field, the first field comprising the secret code value of the mail server and the second field comprising the IP address of the mail server;
the step of creating the association between the secret code value of the mail server and the newly assigned IP address comprises replacing the IP address of the first record with the newly assigned IP address; and the data stored on the second computer associating the secret code value of the mail server with the IP address of the mail server is in the form of a second record having at least a first and a second field, the first field comprising the secret code value of the mail server and the second field comprising the domain name of the mail server.

14. The system of claim 11, wherein the one or more programs executing on the first computer perform the further steps of:
receiving, from the mail server, a notification of a newly assigned IP address for the mail server; and
creating an association between the secret code value of the mail server and the newly assigned IP address; and
wherein the steps performed by the one or more programs executed by the second computer further comprise:
receiving a first request from the third computer for the identity of the mail server, wherein the first request includes the domain name of the mail server;
responding to the first request by providing a mail exchange record to the third computer, wherein the mail exchange record includes the secret code value for the mail server;
receiving a second request from the third computer for the IP address of the mail server, wherein the second request includes the secret code value for the mail server; and
responding to the second request by providing an address record to the third computer, wherein the address record includes the IP address of the mail server.

15. The system of claim 14, wherein:
the data stored on the first computer associating the secret code value of the mail server with the IP address of the mail server is in the form of a first record having at least a first and a second field, the first field comprising the secret code value of the mail server and the second field comprising the IP address of the mail server;
the step of creating the association between the secret code value of the mail server and the newly assigned IP address comprises replacing the IP address of the first record with the newly assigned IP address; and
the data stored on the second computer associating the secret code value of the mail server with the IP address of the mail server is in the form of a second record having at least a first and a second field, the first field comprising the secret code value of the mail server and the second field comprising the domain name of the mail server.

16. The system of claim 11, wherein the steps performed by the one or more programs executed by the second computer further comprise:
receiving a first request from the third computer for the identity of the mail server, wherein the first request includes the domain name of the mail server;
responding to the first request by providing a mail exchange record to the third computer, wherein the mail exchange record includes the secret code value for the mail server;

receiving a second request from the third computer for the IP address of the mail server, wherein the second request includes the secret code value for the mail server; and responding to the second request by providing an address record to the third computer, wherein the address record includes the IP address of the mail server.

17. The system of claim 11, wherein:

the data stored on the first computer associating the secret code value of the mail server with the IP address of the mail server is in the form of a record having at least a first and a second field, the first field comprising the secret code value of the mail server and the second field comprising the IP address of the mail server; and the data stored on the second computer associating the secret code value of the mail server with the IP address of the mail server is in the form of a record having at least a first and a second field, the first field comprising the secret code value of the mail server and the second field comprising the domain name of the mail server.

* * * * *

UNITED STATES PATENT AND TRADEMARK OFFICE
CERTIFICATE OF CORRECTION

PATENT NO.    : 6,434,600 B2
DATED         : August 13, 2002
INVENTOR(S)   : Waite et al.

It is certified that error appears in the above-identified patent and that said Letters Patent is hereby corrected as shown below:

Column 6,
Line 2, change "routeable" to -- routable --.

Column 16,
Line 28, change "nonrouteable" to -- nonroutable --.
Line 34, change "routeable" to -- routable --.

Signed and Sealed this

Eighth Day of April, 2003

JAMES E. ROGAN
*Director of the United States Patent and Trademark Office*